(12) United States Patent
Ebergen et al.

(10) Patent No.: US 6,954,772 B2
(45) Date of Patent: *Oct. 11, 2005

(54) METHOD AND APPARATUS FOR PERFORMING MODULAR DIVISION

(75) Inventors: Josephus C. Ebergen, San Francisco, CA (US); Sheueling Chang Shantz, Cupertino, CA (US)

(73) Assignee: Sun Microsystems, Inc, Santa Clara, CA (US)

( * ) Notice: Subject to any disclaimer, the term of this patent is extended or adjusted under 35 U.S.C. 154(b) by 610 days.

This patent is subject to a terminal disclaimer.

(21) Appl. No.: 10/091,968

(22) Filed: Mar. 5, 2002

(65) Prior Publication Data

US 2002/0138533 A1 Sep. 26, 2002

Related U.S. Application Data

(63) Continuation-in-part of application No. 09/734,972, filed on Dec. 11, 2000, now Pat. No. 6,772,972, which is a continuation-in-part of application No. 09/649,356, filed on Aug. 28, 2000, now Pat. No. 6,721,771.

(51) Int. Cl.$^7$ ................................................. G06F 7/38
(52) U.S. Cl. ....................................... 708/491; 708/650
(58) Field of Search ................................ 708/491, 492, 708/650, 653

(56) References Cited

U.S. PATENT DOCUMENTS

| | | | |
|---|---|---|---|
| 5,073,870 A | * | 12/1991 | Morita ........................ 708/491 |
| 6,212,538 B1 | * | 4/2001 | Plessier ....................... 708/492 |
| 6,763,366 B2 | * | 7/2004 | Hars et al. ................... 708/491 |

* cited by examiner

Primary Examiner—Chuong D Ngo
(74) Attorney, Agent, or Firm—Park, Vaughan & Fleming, LLP

(57) ABSTRACT

One embodiment of the present invention provides a system that performs modular division. This system contains a number of registers, including: a register A that is initialized with a value X; a register U that is initialized with a value Y; a register B that is initialized with a value M; and a register V that is initialized with a value 0. The system also includes a temporary register H, and a temporary register L. An updating mechanism is configured to iteratively reduce the contents of registers A and B to a value of one by applying a plurality of operations to registers A, B, U and V. During operation, this updating mechanism temporarily stores A+B in the temporary register H, and temporarily stores U+V in the temporary register L.

21 Claims, 8 Drawing Sheets

METHOD AND APPARATUS FOR PERFORMING MODULAR DIVISION

RELATED APPLICATION

This application is a continuation-in-part of U.S. patent application Ser. No. 09/734,184, entitled, "Method for Efficient Modular Division Over Prime Integer Fields," filed on Dec. 11, 2000, now U.S. Pat. Ser. No. 6,772,972, which is itself a continuation-in-part of U.S. patent application Ser. No. 09/649,356, entitled, "Method for Efficient Modular Polynomial Division Over Finite Fields F(2^M)," filed on Aug. 28, 2000, now U.S. Pat. No. 6,721,771. This application hereby claims priority under 35 U.S.C. § 120 to the above-referenced patent applications. The subject matter of this application is also related to the subject matter in a co-pending non-provisional application by the same inventors as the instant application and filed on the same day as the instant application entitled, "Method And Apparatus For Performing Modular Division Using Counters," having Ser. No. 10/091,962, and filing date Mar. 5, 2002.

BACKGROUND

1. Field of the Invention

The present invention relates to performing computational operations within computer systems. More specifically, the present invention relates to a method and an apparatus for efficiently performing modular division over binary polynomial fields and/or prime integer fields.

2. Related Art

Modular division is a commonly performed operation in elliptic-curve cryptographic algorithms. For example, a modular division operation for the polynomial field $GF(2^N)$ takes as inputs two elements $X(t)$ and $Y(t)$ of $GF(2^N)$, both represented as binary polynomials in t of degree less than N, and an irreducible polynomial $M(t)$ in $GF(2^N)$. The modular division operation produces a residue $R(t)$, which is also an element of $GF(2^N)$. This residue $R(t)$ is defined by the equation $R(t)=Y(t)/X(t) \mod M(t)$.

Note that binary polynomials can be represented by long bit strings, which makes arithmetic operations easy to implement. For example, in $GF(2^N)$ additions and subtractions can be implemented by a bit-wise exclusive-OR operation. Also, dividing a polynomial $A(t)$ by t, denoted by $A(t)/t$, is simply a right-shift operation of the bit string representing $A(t)$. Within this specification, the bit string representing $A(t)$ is represented as A and the operation $A(t)/t$ is represented as shift(A). Furthermore, a comparison of polynomials is equivalent to the comparison of their bit strings as integers.

One problem in performing modular division is that existing techniques require the constituent sub-operations to be performed in sequence, without exploiting possible parallelism. Another problem is that existing techniques typically require comparison operations between large binary numbers, which can be extremely time-consuming.

What is needed is a method and an apparatus for performing a modular division operation without the above-described problems.

SUMMARY

One embodiment of the present invention provides a system that performs modular division. This system contains a number of registers, including: a register A that is initialized with a value X; a register U that is initialized with a value Y; a register B that is initialized with a value M; and a register V that is initialized with a value 0. The system also includes a temporary register H, and a temporary register L. An updating mechanism is configured to iteratively reduce the contents of registers A and B to a value of one by applying a plurality of invariant operations to registers A, B, U and V. During operation, this updating mechanism temporarily stores A+B in the temporary register H, and temporarily stores U+V in the temporary register L.

In a variation on this embodiment, the initial values in the registers A, B, U and V satisfy invariant relationships, including $A*Y=U*X \mod M$, and $B*Y=V*X \mod M$.

In a further variation, the updating mechanism maintains the invariant relationships after application of the plurality of invariant operations. In a further variation, the plurality of invariant operations include:

if A is even and U is even, then A:=SHIFT(A), U:=SHIFT(U);

if A is even and U is odd, then A:=SHIFT(A), U:=SHIFT(U+M);

if B is even and V is even, then B:=SHIFT(B), V:=SHIFT(V);

if B is even and V is odd, then B:=SHIFT(B), V:=SHIFT(V+M);

if A>B, then A:=A+B and U:=U+V; and if A<B, then B:=A+B and V:=U+V;

wherein the SHIFT operation denotes a right shift by one bit of the register contents.

In a further variation, setting A=A+B and U=U+V involves first setting H=A+B and L=U+V, and later setting A=H and U=L if A≧B. Furthermore, setting B=A+B and V=U+V involves first setting H=A+B and L=U+V, and later setting B=H and V=L if A<B.

In a further variation, the operations of setting H=A+B, setting L=U+V, and determining if A≧B or if B>A take place concurrently.

In a variation on this embodiment, components of the updating mechanism operate asynchronously, without use of a centralized clock signal.

In a variation on this embodiment, the system includes a counter CA that indicates an upper bound for the most-significant non-zero bit of register A. It also includes a counter CB that indicates an upper bound for the most-significant non-zero bit of register B. In this embodiment, the updating mechanism is configured to use counters CA and CB to estimate the relative magnitudes of the values stored in registers A and B instead of performing an expensive comparison operation between register A and register B.

Table 1 contains code to perform the modular division operation in accordance with an embodiment of the present invention.

Table 2 contains code to perform the modular division operation without time-consuming comparison operations in accordance with another embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Computer System

Figure 1:
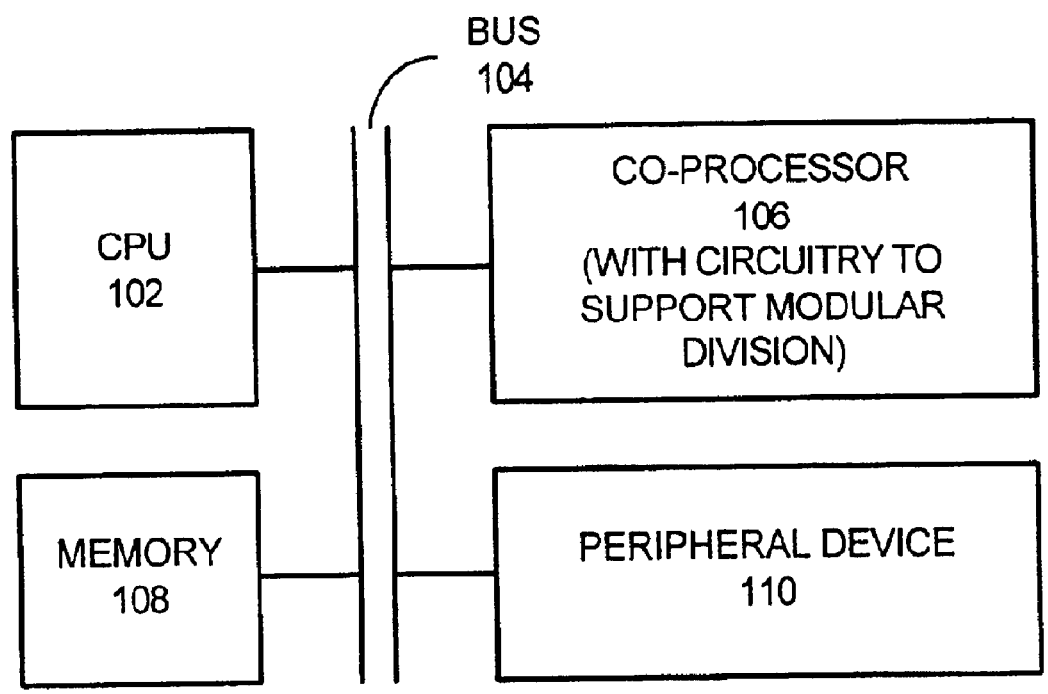
FIG. 1 illustrates a computer system in accordance with an embodiment of the present invention.

FIG. 1 illustrates a computer system 100 in accordance with an embodiment of the present invention. Computer system 100 can generally include any type of computer system, including, but not limited to, a computer system based on a microprocessor, a mainframe computer, a digital signal processor, a portable computing device, a personal organizer, a device controller, and a computational engine within an appliance.

In one embodiment of the present invention, computer system 100 includes a central processing unit (CPU) 102, which is coupled to a memory 108 through a bus 104. CPU 102 generally executes code and manipulates data stored within memory 108. CPU 102 can also communicate with one or more peripheral devices, such as peripheral device 110 coupled to bus 104.

CPU 102 additionally communicates with co-processor 106, which includes special-purpose circuitry to facilitate modular division operations. This special-purpose circuitry is described in more detail below with reference to FIGS. 2–6.

Although the present invention is described in the context of the computer system illustrated in FIG. 1, the present invention can be applied to any computer system that includes special-purpose circuitry to facilitate modular division. Hence, many variations of the present invention will be apparent to practitioners skilled in the art. For example, the special-purpose circuitry to support modular division may be located within an arithmetic unit of CPU 102 instead of residing on an attached co-processor.

Circuitry to Support Modular Division

Figure 2:
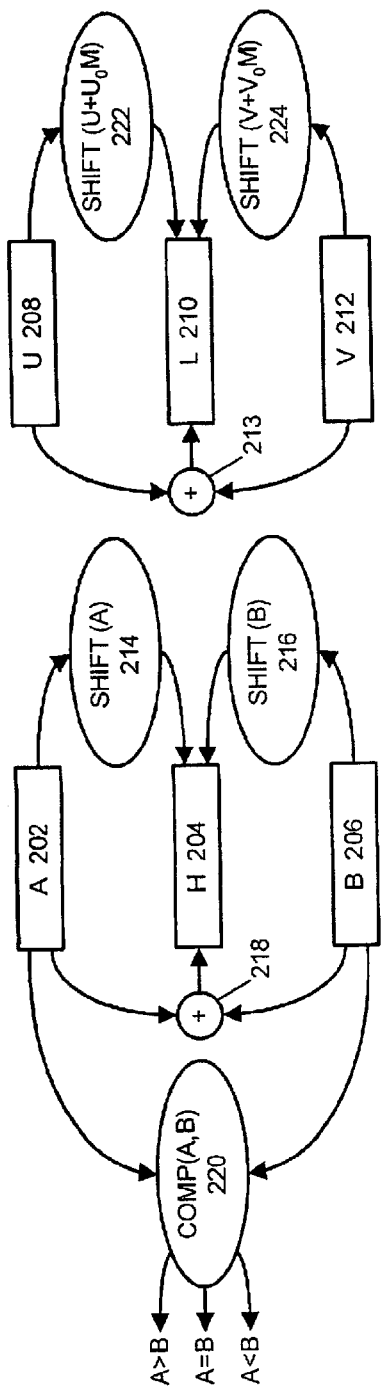
FIG. 2 illustrates circuitry to support modular division in accordance with an embodiment of the present invention.

FIG. 2 illustrates a system to support modular division in accordance with an embodiment of the present invention. This system includes a number of registers, including: a register A 202 that is initialized with a value X; a register U 208 that is initialized with a value Y; a register B 206 that is initialized with a value M; and a register V 212 that is initialized with a value 0. The system also includes temporary registers H 204 and L 210.

TABLE 1

| | |
|---|---|
| a:=X; b:=M; u:=Y; v:=0; | (0) |
| while even (a) do { | (1) |
|    a:=shift (a); | (2) |
|    if even (u)   then u:=shift (u) | (3) |
|                     else u:=shift (u+M); | (4) |
| } | (5) |
| while (a not_equal b)   do { | (6) |
|    if (a>b) then { | (7) |
|       a:=a+b; u:=u+v; | (8) |
|       while even (a)   do { | (9) |
|          a:=shift (a); | (10) |
|          if even (u)  then u:=shift (u) | (11) |
|                       else u:=shift (u+M); | (12) |
|       } | (13) |
|    } else { | (14) |
|       b:=b+a; v:=v+u; | (15) |
|       while even (b)   do { | (16) |
|          b:=shift (b) ; | (17) |
|          if even (v)  then v:=shift (v) | (18) |
|                       else v:=shift (v+M); | (19) |
|       } | (20) |
|    } | (21) |
| } | (22) |

In addition to these registers, the system includes circuitry 214, 216, 222 and 224 to perform various shift operations. The system also includes circuitry 218 to perform an addition operation between registers A 202 and B 206, and corresponding circuitry 213 to perform addition operations between register U 208 and V 212. Furthermore, the system includes a comparison circuit 220, which compares the value stored in register A 202 with the value stored in register B 206 to determine if A>B, A=B or A<B.

The operation of this circuitry is described in more detail below with reference to FIGS. 3–6.

Modular Division Operation

The modular division operation illustrated in Table 1 above repetitively performs comparisons, additions, parity tests, and shifts of bit strings. This modular division operation makes use of four variables a, b, u and v, which represent long bit strings. The invariants of the operation are P1: $a*Y=u*X \mod M$ and $b*Y=v*X \mod M$ P2: $\gcd(a,b)=\gcd(X,M)$ where gcd(a,b) denotes the greatest common divisor of a and b in $GF(2^N)$.

Apart from initialization, only two program fragments change the values of the variables a, b, u, and v.

The first program fragment is as follows.

a:=shift(a);

if even(u) then u:=shift(u)

else u:=shift(u+M);

This fragment occurs in lines (2)–(4), (10)–(12), and, with different variables, in lines (17)–(19).

The second fragment is as follows.

a:=a+b; u:=u+v;

This fragment occurs in line (8) and, with different variables, in line (15). The following section explains how these assignments are implemented in hardware.

Finite State Machine

Figure 3:
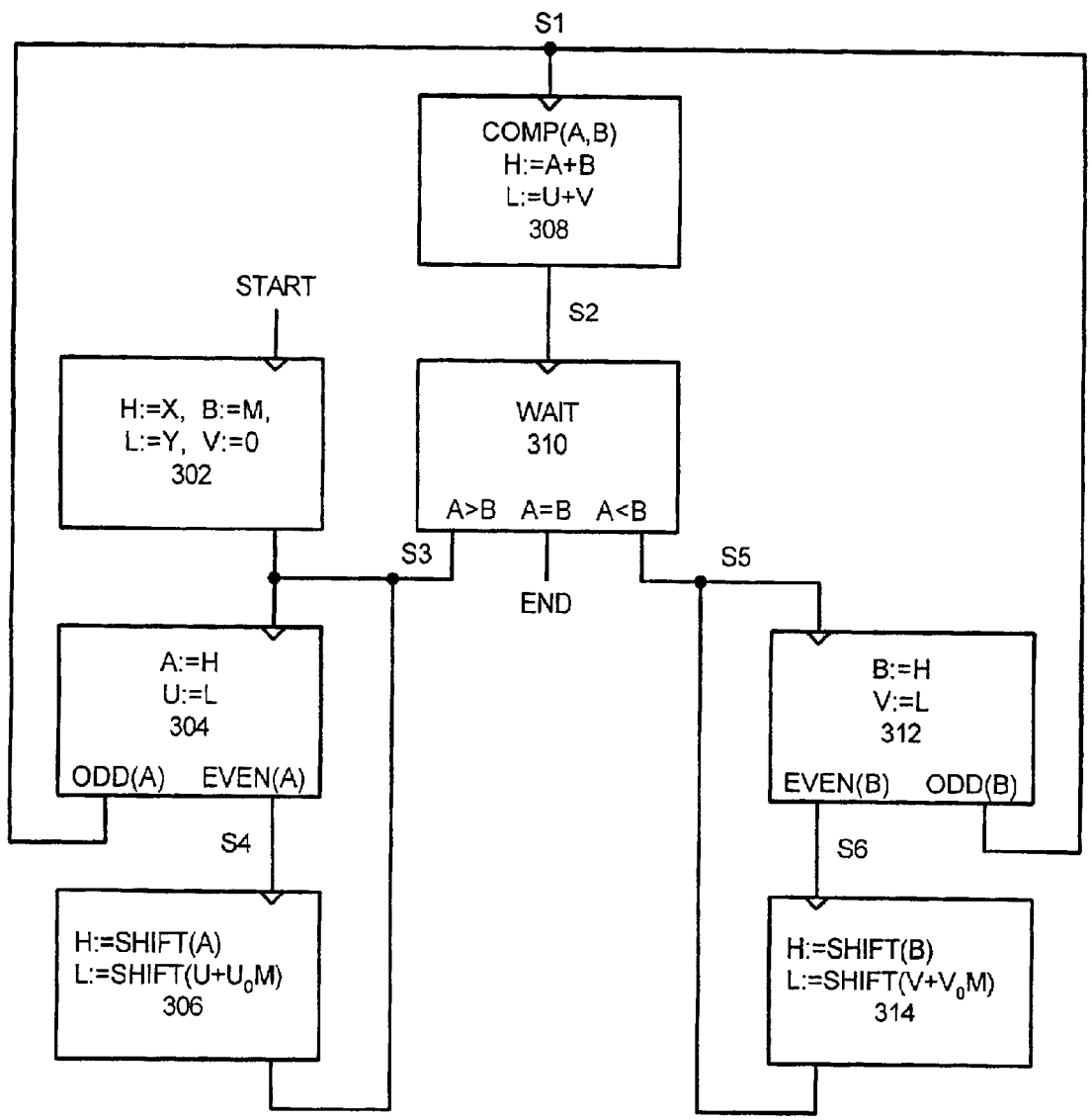
FIG. 3 is a flow graph illustrating the modular division process in accordance with an embodiment of the present invention.

A finite-state-machine representation for the modular division operation that appears in FIG. 3. Note that the variables a, b, u, v, h, and l are stored in corresponding registers A 202, B 206, U 208, V 212, H 204 and L 210. FIG. 3 specifies a sequence of data operations and conditional statements similar to those that appear in Table 1, but with a few important differences.

In order to simplify the hardware implementation of assignments of the form b:=f(b), where f(b) is a function of b, the system introduces an auxiliary variable so that the hardware implementation maps variables onto registers and realizes each change of variable b to the value f(b) in two steps: h:=f(b) and b:=h. Note that register H 204 functions as a temporary register to store an interim value. Although it is possible to implement the assignment b:=f(b) in just one step without using a temporary register, this involves more stringent timing constraints. Hence, one embodiment of the present invention uses the two-step implementation and two auxiliary variables h and l.

Note that the illustrated implementation substantially minimizes the number of primitive functions and the number of states of the finite state machine. It also concurrently executes many operations to achieve a high performance. There are only twelve primitive functions in the illustrated finite state machine, apart from initialization. These functions include, comp(a,b),h:=a+b,l:=u+v;

a:=h,u:=l;

b:=h,v:=l;

h:=shift(a),l:=shift(u+u0*M);and h:=shift(b),l:=shift(v+v0*M).

The functions on each line are combinational functions or move operations. If two operations are separated by a comma, the finite state machine can execute both operations concurrently. The expression comp (a,b) represents the comparison of a and b. The expression l:=shift(u+u0*M), where u0 represents the least significant bit of u, is a replacement for the conditional statement "if even(u) then l:=shift(u) else l:=shift(u+M)".

All operations are moves between registers or data operations followed by a move. Each operation may involve a different number of gate delays. As was previously discussed, FIG. 2 presents a diagram of the registers A 202, B 206, U 208, V 212, H 204 and L 210, the moves between these registers, and the data operations that are performed between these registers. The comparison operation comp (a,b) asserts one of three outputs a>b, a=b, and a<b. The finite state machine uses the outcome of the comparison to steer its state transitions.

FIG. 3 shows a flow graph of our finite-state machine. Each box in the flow graph lists the operations executed concurrently by the finite state machine in a particular state. The arcs connecting the boxes represent states of the finite state machine. There are eight states in the finite state machine: START, S1 through S6, and END. State START is the initial state. After performing the actions in one box, the finite state machine performs the actions in the following box, where directed arcs indicate each following box.

The following discussion describes the design of a finite state machine in terms of asynchronous GasP circuitry. A notation for GasP circuitry is described in the last section of this specification with reference to FIGS. 6–10. Note that although implementations of the present invention are described in the context of asynchronous GasP modules, the present invention is not meant to be limited to such modules or to asynchronous implementations. In order to conform to the notation for asynchronous GasP networks, FIG. 3 illustrates the arrowheads of the arcs inside the boxes.

For example, following state S1, the finite state machine performs the operations comp (a,b), h:=a+b and l:=u+v. After completing these actions the finite state machine goes to state S2. In state S2 the finite state machine waits to allow the comparison between a and b to complete. For example, the total time for a comparison between two 163-bit words depends on the implementation and will probably be around 10 gate delays. The result of the comparison steers the finite state machine to its next action.

If a>b the next state is S3. If a=b the next state is END. Finally, if a<b the next state is S5. A similar interpretation is applied to other boxes in order to follow the execution path of the finite state machine. Upon termination, in state END the registers U 208 and V 212 contain the residue of the modular division.

Let us trace a few state transitions. If the finite state machine goes from state START to state S3 and then to state S4 or state S1, it effectively executes the statements a:=X, b:=M, u:=Y and v:=0.

This is exactly the initialization process illustrated in Table 1. If the finite state machine goes from state S4 to state S3 and back to S4, it effectively executes the program fragment "a:=shift(a), u:=shift(u+u0*M)" in two steps: "h:= shift(a), l:=shift(u+u0*M)" followed by "a:=h, u:=l".

Similarly, if the finite state machine goes from state S1 to state S2, to state S3, and then to state S1 or state S4, it effectively executes the program "if a>b then a:=a+b".

If the finite state machine goes from state S1 to state S2, to state S5, and then to state S1 or state S6 it effectively executes the program fragment "if a<b then b:=a+b".

Hence, the finite state machine illustrated in FIG. 3 closely tracks the steps of the code illustrated in Table 1.

Note that the circuitry is nearly a complete logic implementation of the code from Table 1 in terms of an asynchronous GasP network. Also note the simplicity in mapping an operation to a state graph like the one in FIG. 3. Although a number of optimizations have been made, the process itself is straightforward.

Circuitry to Support Modular Division Without Comparisons

Figure 4:
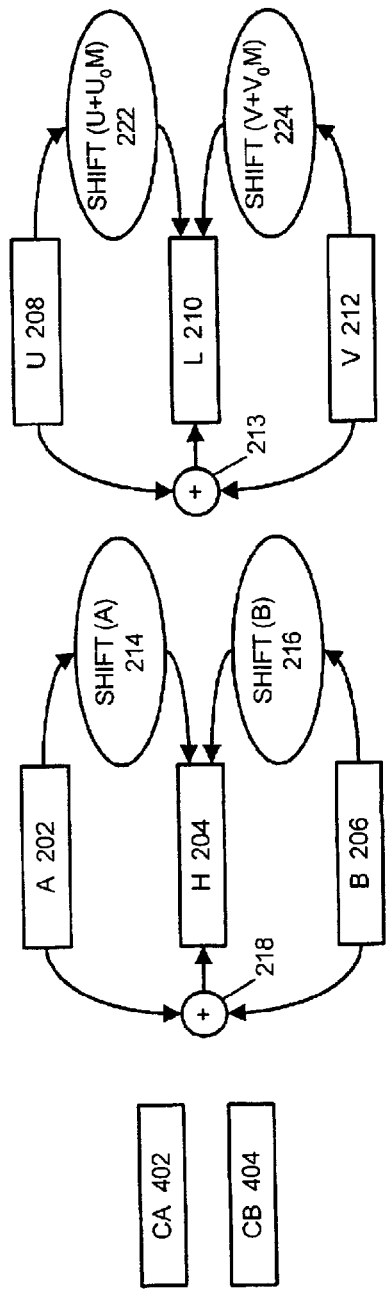
FIG. 4 illustrates circuitry to support modular division without comparison operations in accordance with another embodiment of the present invention.

FIG. 4 illustrates circuitry to support modular division without comparison operations in accordance with another embodiment of the present invention. This circuitry is the same as the circuitry that appears in FIG. 2, except that the comparison module 220 from FIG. 2 has been replaced with two counters CA 402 and CB 404. The counter CA 402 contains a variable ca indicating an upper bound for the most-significant non-zero bit of register A 202. Similarly, the counter CB 404 contains a variable cb indicating an upper bound for the most-significant non-zero bit of register B 206. The system uses the counters CA 402 and CB 404 to determine the relative magnitudes of the values stored in registers A 202 and B 206 instead of performing an expensive comparison operation between register A 202 and register B 206. This process is described below.

Modular Division Operation Without Comparisons

In many practical cryptographic applications, the bit strings for X(t), Y(t), and M(t) are very large. For example, for applications in elliptic curve cryptography the bit strings are more than 160 bits. To implement a modular division operation with special-purpose hardware, we have to implement the following operations on large numbers: comparison, parity test, addition, and shift. The parity test, addition, and shift are simple operations and can be carried out in one or two gate delays. A comparison, however, takes about $\log_2 N$ gate delays, which is roughly eight gate delays for N>160. Thus, comparing large numbers is a time-consuming operation for special-purpose hardware.

In order to avoid these comparisons, we introduce a variation of the modular division operation in this section. This variation employs small counters, CA 402 and CB 404, that keep track of where the most significant bits of the values of a and b are located. Instead of performing costly comparisons on large numbers, this variation performs simple increment and decrement operations on these counters. Since these operations on counters can be performed in parallel with other operations, we can hide the cost of the counter operations and of the original comparisons completely.

The counters for a and b are represented by ca and cb, respectively. The value of ca indicates an upper bound for the position of the most-significant non-zero bit of a. The position MSB(a) of the most-significant non-zero bit of a is defined as follows. Let $a_i$ denote the bits of a where $0 \leq i \leq N$.

$$MSB(a) = \max\{i | a_i \neq 0\}$$

If a=0, then MSB(a)=$-\infty$. The value for cb is an upper bound for MSB(b).

Using the counters CA 402 and CB 404, the modular division algorithm can be rewritten without time-consuming comparisons between a and b.

TABLE 2

| | |
|---|---|
| a:=X; b:=M; u:=Y; v:=0; ca:=N−1; cb:=N; | (0) |
| while (even (a) and ca>=0) do { | (1) |
|     a:=shift (a); ca:=ca−1; | (2) |
|     if even (u)    then u:=shift (u) | (3) |
|                     else u:=shift (u+M); | (4) |
| } | (5) |

TABLE 2-continued

| | |
|---|---|
| while (ca>=0 and cb>=0) do { | (6) |
|   if (ca>cb)    then } | (7) |
|     a:=a+b; u:=u+v; | (8) |
|     while (even (a) and ca>=0) do { | (9) |
|       a:=shift (a); ca:=ca−1; | (10) |
|       if even (u)  then u:=shift (u) | (11) |
|                   else u:=shift(u+M); | (12) |
|     } | (13) |
| } else if (ca<=cb)   then { | (14) |
|     b:=b+a; v:=v+u; | (15) |
|     while (even (b) and cb>=0) do { | (16) |
|       b:=shift (b); cb:=cb−1; | (17) |
|       if even (v)  then v:=shift (v) | (18) |
|                   else v:=shift (v+M); | (19) |
|     } | (20) |
|   } | (21) |
| } | (22) |
| if (ca<0) then r:=v | (23) |
| else if (cb<0) then r:=u | (24) |

Finite State Machine

The division operation that appears in Table 2 can be represented in terms of a finite state machine, which is similar to the finite state machine that appears in FIG. 3.

To obtain a small implementation we try to reduce the number of primitive functions and the number of states of the finite state machine to the bare minimum. We also try to execute several operations concurrently, if possible. There are only fourteen primitive functions in the finite state machine, apart from initialization.

h:=a+b, l:=u+v;

a:=h, u:=l;

b:=h, v:=l;

h:=shift(a), l:=shift(u+u0*M), ca:=ca−1;

h:=shift(b), l:=shift(v+v0*M), cb:=cb−1;

r:=v; and r:=u.

The functions on each line are actually combinational functions and move operations. If two operations are separated by a comma, the finite state machine executes both operations concurrently. The expression l:=shift(u+u0 *M), where u0 represents the least significant bit of u, is a replacement for the conditional statement, if even(u) then l:=shift(u) else l:=shift(u+M).

Apart from the decrements to counters, all operations are moves between registers, bit-wise exclusive-ORs, and shifts, each of which can be implemented in a few gate delays. FIG. 4 shows a diagram of the registers A 202, B 206, U 208, V 212, H 204, L 210, CA 402 and CB 404 for the variables a, b, u, v, h, l, ca and cb, respectively. It also illustrates the moves between these registers and the data operations that must be performed.

Figure 5:
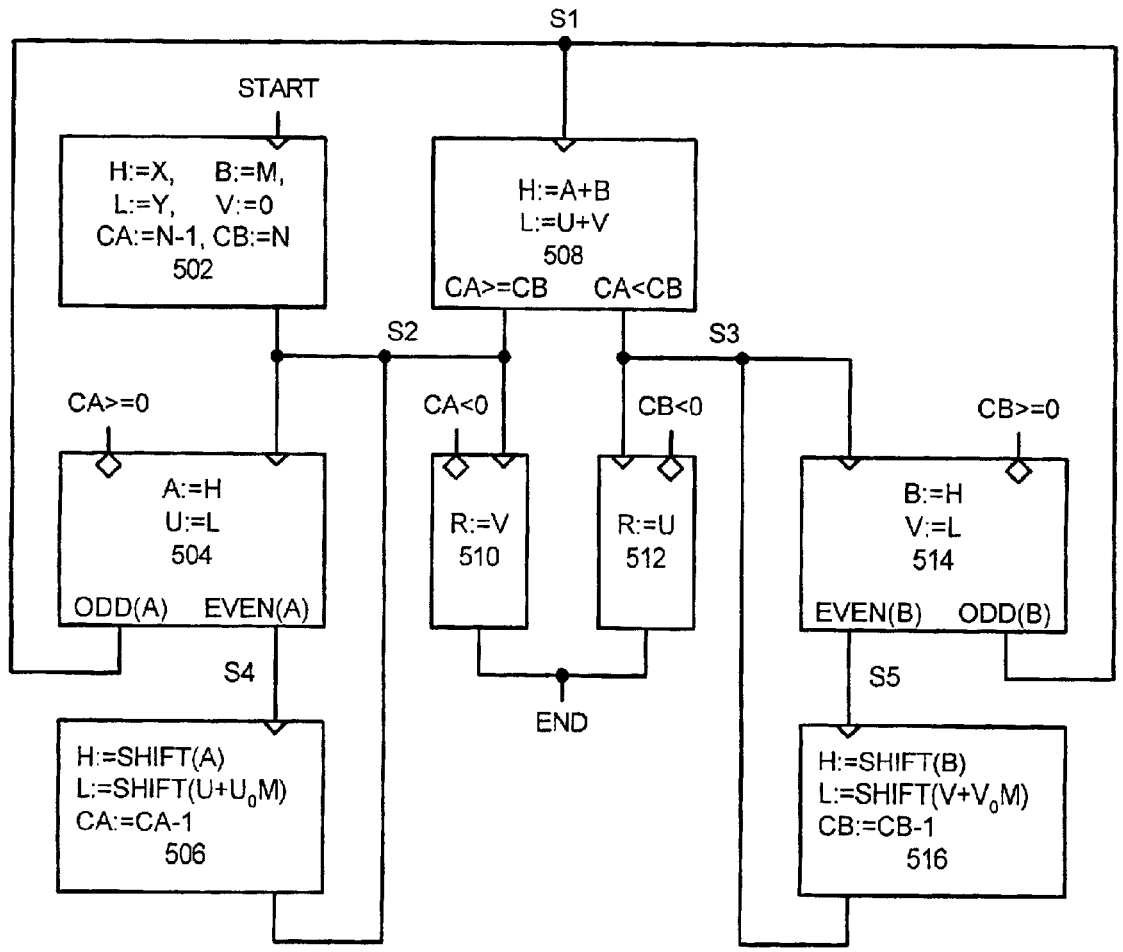
FIG. 5 is a flow graph illustrating the modular division process without comparison operations accordance with an embodiment of the present invention.

FIG. 5 shows a flow graph of the actions of our finite-state machine. Each box in the flow graph lists the actions the finite state machine performs concurrently in a particular state. The arcs connecting the boxes represent states of the finite state machine. There are seven states: START, S1 through S5, and state END. State START is the initial state. After performing the actions in one box, the finite state machine performs the actions in the following box, where directed arcs indicate each following box. The arrowheads of the arcs appear inside the boxes.

For example, in state S1 the finite state machine performs the actions "h:=a+b, l:=u+v". After completing these actions, the finite state machine goes to state S2, if ca≥cb, or to state S3, if ca<cb. In state S2, the finite state machine can execute the actions in box 504 and the actions in box 510. Note, however, that these boxes also have a small diamond shape with an associated condition. The meaning of these diamonds and their conditions is that in each state the finite state machine performs the actions inside a box if and only if the condition associated with the diamond is valid. Thus, in state S2, the finite state machine either executes the actions in box 504 "a:=h, u:=l", if ca≧0, or the action in box 510 "r:=v", if ca<0. A similar reasoning applies to state S3.

In a hardware implementation, up-down counters can keep track of the values for ca≧0, cb≧0, and ca−cb<0. These counters also implement the decrements and increments to ca, cb, and ca−cb respectively. Moreover, the actions on these counters can be executed concurrently with the register operations.

Asynchronous GasP Circuitry: Notation for Specifications

In order to specify a parallel composition of finite state machines, we introduce a small program notation. This program notation specifies all sequences of allowable events for a finite state machine. Examples of events are data movements from one location to another, data-dependent decisions, or synchronizations between finite state machines. In its most basic form, a finite state machine is specified by a list of state transitions with an initial state. Here is an example.

```
    state S0 where                (1)
        S0=(a->S1)                (2)
        S1=(b->S0                 (3)
           |c->S2)                (4)
        S2=(d->if B then S0       (5)
               else S1 fi)        (6)
    end                           (7)
```

This finite state machine has three states S0, S1, and S2. At any time during execution, each finite state machine is in exactly one state. State S0 is the initial state, as specified by line (1). Lines (2) through (6) specify all state transitions. Line (2) stipulates that in state S0 an occurrence of event a leads to state S1. The arrow "->" represents "leads to." In state S1, an occurrence of event b leads to state S0, as specified in line (3), or an occurrence of event c leads to state S2, as specified by line (4). The bar "|" in line (4) represents "or." The choice between event b and event c is made either by the finite state machine itself, in which case the choice is a non-deterministic choice or by the environment of the finite state machine, in which case the choice is a deterministic choice. The environment can determine the choice by selecting either event a or event b. In this discussion we consider only deterministic choices.

Lines (5) and (6) specify a data-dependent choice. Depending on the value of bit B, an occurrence of event d in state S2 leads to state S0, when B=1, or to state S1, when B=0. The names for states are always local and can be reused outside their scope, viz., lines (1) through (7). Names for events always start with a lower-case letter. For the moment we assume that event names are global.

The parallel composition of two finite state machines FSM0 and FSM1 is denoted by

FSM1 & FSM1

The parallel composition of two finite state machines represents all sequences of events that conform to each of the finite state machines. A common event of two machines can occur only when both machines are in a state that permit the common event. On can say that parallel composition is the "behavioral AND" of two finite state machines, hence the notation &. Formally, the parallel composition is defined by a weave of trace structures.

GasP Modules

We denote a GasP module by means of a rectangular box with a label inside and a series of connections. The label denotes the event that is associated with the GasP module. Each GasP module can have three different types of connections. FIGS. 6 and 7 give the three types of connections of a GasP module together with their 2–4 GasP implementations. FIG. 6 shows the symbols and their implementations for connections between GasP modules where the time separation between the "firings" of two modules is two gate delays. FIG. 7 shows the symbols and their implementations for connections between GasP modules where the time separation between the "firings" of two modules is four gate delays. Both figures show connections attached to the left and the right of a GasP module. Apart from a reflection, the implementations of the left-side and right-side connections are the same.

Figure 6A:
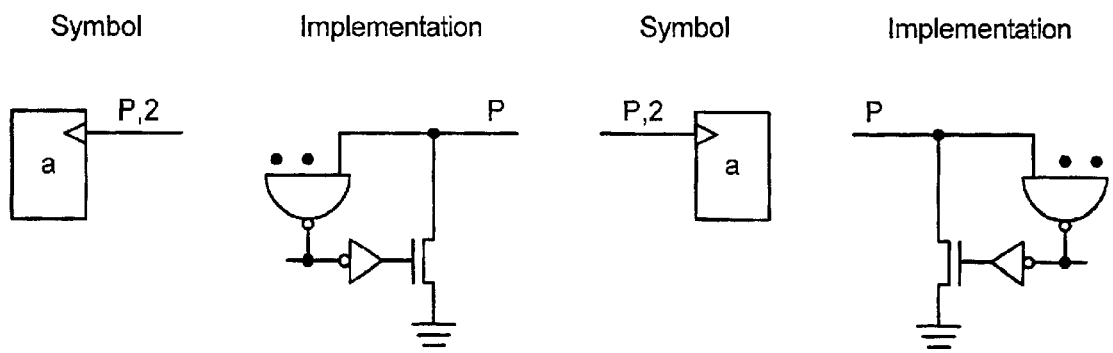
FIG. 6A illustrates a type of terminal connection for a GasP module with a time separation of two gate delays between firings of modules in accordance with an embodiment of the present invention.
Figure 6B:
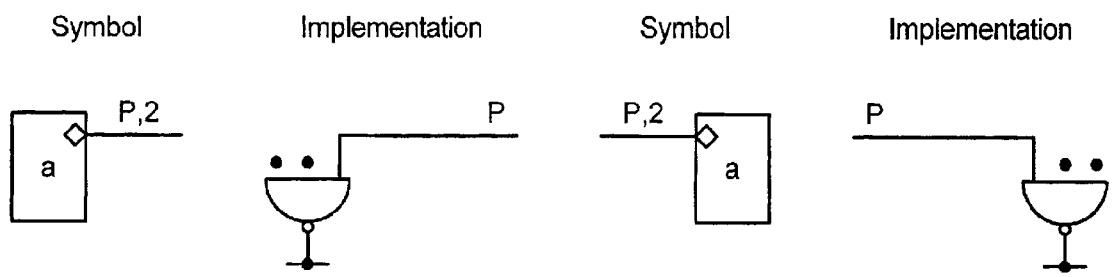
FIG. 6B illustrates another type of terminal connection for a GasP module with a time separation of two gate delays between firings of modules in accordance with an embodiment of the present invention.
Figure 6C:
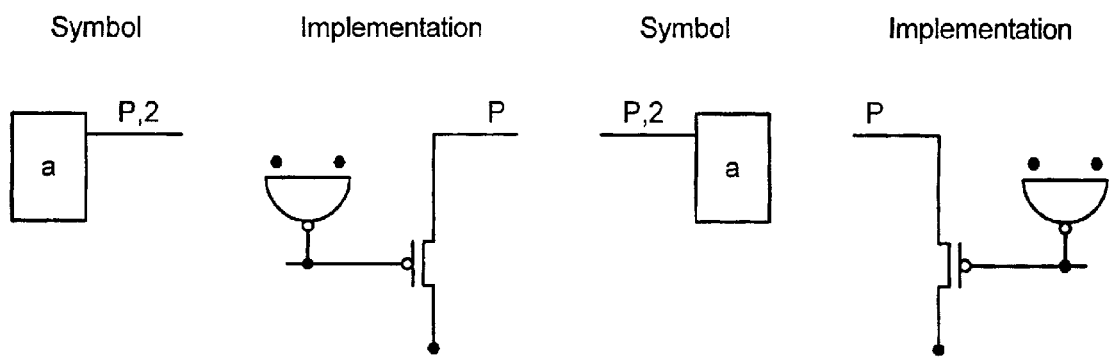
FIG. 6C illustrates yet another type of terminal connection for a GasP module with a time separation of two gate delays between firings of modules in accordance with an embodiment of the present invention.
Figure 7A:
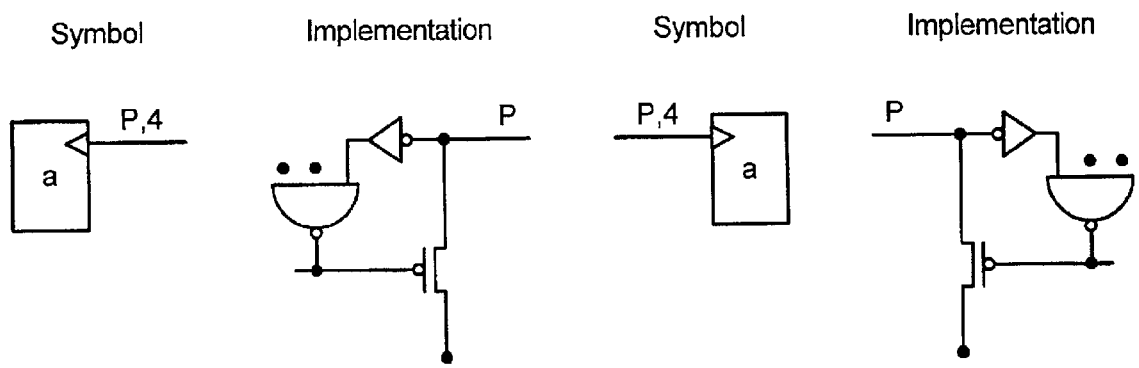
FIG. 7A illustrates a type of terminal connection for a GasP module with a time separation of four gate delays between firings of modules in accordance with an embodiment of the present invention.
Figure 7B:
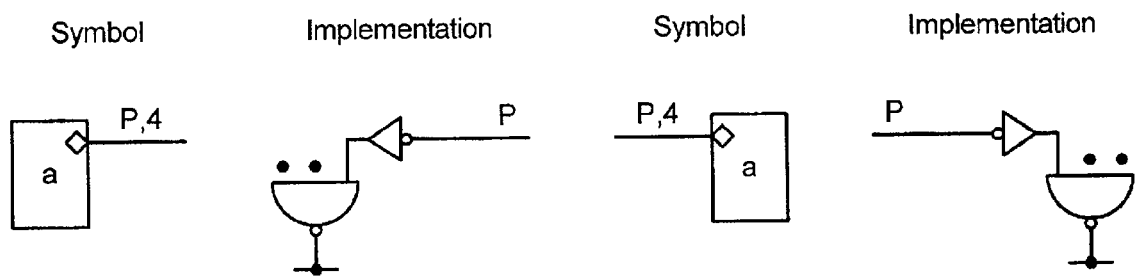
FIG. 7B illustrates another type of terminal connection for a GasP module with a time separation of four gate delays between firings of modules in accordance with an embodiment of the present invention.
Figure 7C:
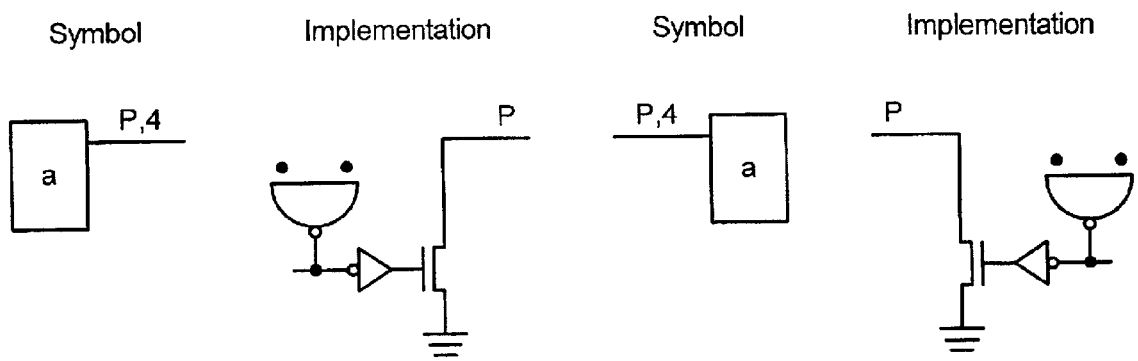
FIG. 7C illustrates yet another type of terminal connection for a GasP module with a time separation of four gate delays between firings of modules in accordance with an embodiment of the present invention.

FIG. 6A shows a GasP module with a so-called self-resetting input. FIG. 6B shows a GasP modules with a so-called non-resetting input. FIG. 6C shows a GasP module with an output. Common in all GasP module implementations is a NAND gate. To complete the GasP Module implementation, circuitry is added to the NAND gate for each connection. When all inputs of a GasP module are set, which means HI in the implementations of FIGS. 6A and 6B, the NAND gate will eventually "fire," i.e., go LO. The firing of the NAND gate defines the occurrence of the event. After the NAND gate fires, a pull-down transistor resets each self-resetting input. The non-resetting input has no reset capability. When the NAND gate fires, the pull-up transistor sets the output.

FIG. 7 illustrates the same ideas as in FIG. 6, except that now "setting" and "resetting" are implemented differently. Here, an input is set when the input is LO. Thus, resetting an input happens by means of a pull-up transistor, and setting an output happens by means of a pull-down transistor.

Each connection is implemented as a tri-state wire with a keeper. A tri-state wire is a wire that is either "driven HI", "driven LO", or "not driven." To avoid clutter, connections in schematics appear as lines between GasP modules, and keepers are not shown. When a connection is driven HI or LO, the connection will be driven for a short period only, a period that is long enough to set the keeper and wire HI or LO. The keeper will then keep the state of the connection when the wire is not driven. Using the GasP implementations of FIGS. 6 and 7, the period that a wire is driven is about three gate delays. Notice that each pull-down or pull-up transistor conducts for a period of about three gate delays.

In order for these implementations to work properly, all transistors must be properly sized. Here, this means that all gates must have the same step-up ratio, i.e., the ratio between each gate's drive strength and output load is the same. When properly sized, each gate has about the same delay, and thus we can justifiably speak about units of delay between any two events.

Figure 8A:
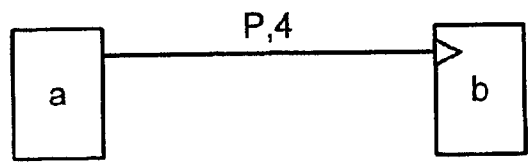
FIG. 8A is a symbolic representation of a connection between GasP modules with a delay of four units between two events in accordance with an embodiment of the present invention.
Figure 8B:
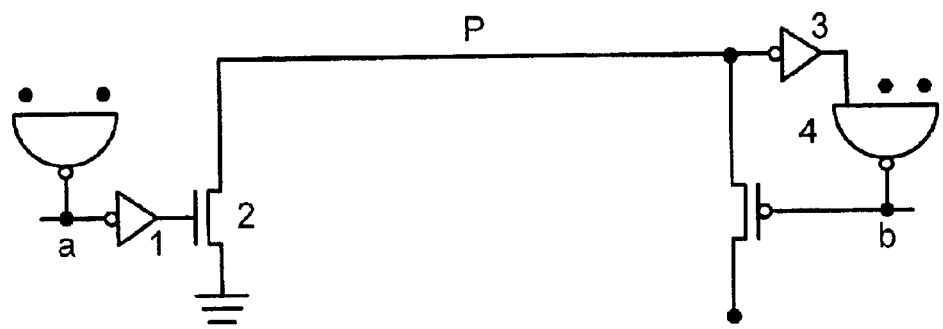
FIG. 8B illustrates corresponding circuitry for a connection between GasP modules with a delay of four units between two events in accordance with an embodiment of the present invention.
Figure 8C:
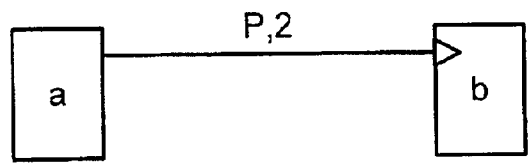
FIG. 8C is a symbolic representation of a connection between GasP modules with a delay of two units between two events in accordance with an embodiment of the present invention.
Figure 8D:
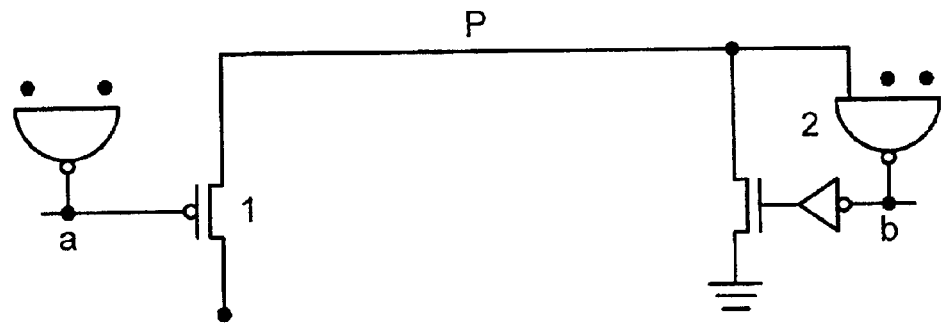
FIG. 8D illustrates corresponding circuitry for a connection between GasP modules with a delay of two units between two events in accordance with an embodiment of the present invention.

The label P on the connections to the GasP modules in FIGS. 6 and 7 gives a name to the connections and is often associated with the name of the state to which the connection corresponds. The labels 2 and 4 indicate whether the implementation of the connection must realize a time separation of two or four gate delays, respectively, between firings of successive GasP modules. FIG. 8 illustrates this idea. FIG. 8A shows a simple connection between GasP modules and FIG. 8B shows its implementation. The label 4 indicates that the connection must realize time separation of four gate delays between the firings of modules a and b. Notice that between node a going LO and node b going LO in FIG. 8B there are four gate delays. Similar remarks can be made for FIGS. 8C and 8D, where the label 2 denotes a time separation of two gate delays. The labels 2 and 4 will come in handy later when we want to calculate cycle times in GasP networks.

Figure 9A:
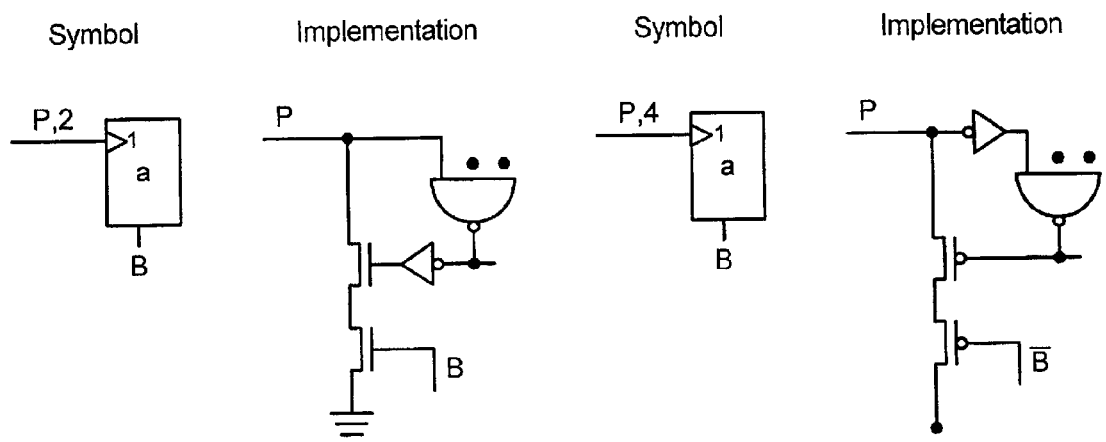
FIG. 9A illustrates conditional self-resetting inputs in accordance with an embodiment of the present invention.
Figure 9B:
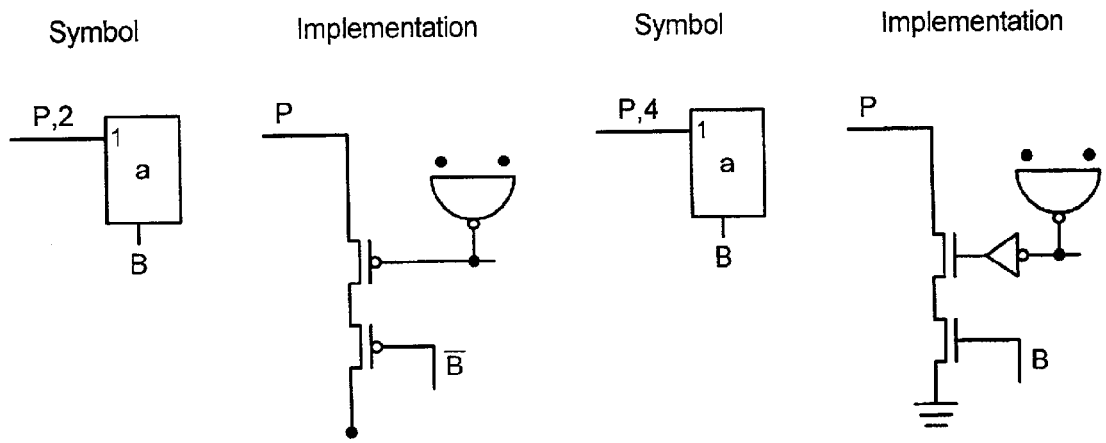
FIG. 9B illustrates conditional outputs in accordance with an embodiment of the present invention.

FIG. 9 shows the GasP modules that are used for data-dependent decisions. The general rule for these GasP modules is that a GasP module sets an output or resets an input if and only if the value of bit B corresponds to the label attached to that output or input respectively. In FIG. 9A resetting the self-resetting inputs is conditional on the value of bit B. Label 1 near the self-resetting input denotes that the input resets if and only if the value of B is 1. In FIG. 9B, setting the output is conditional on the value of B. For a data-dependent choice where the label 1 is replaced by 0, interchange B and B in the implementations.

In order to implement a data-dependent decision properly, there are two delay constraints that must be satisfied: bit B must be valid when event a can occur and bit B must remain valid for the duration of the pulse at the output of the NAND gate.

In an implementation we indicate the initial state of each connection by darkening the arrowheads or diamonds inside the modules that are associated with the connection. A connection with a darkened arrowhead or diamond is initially set, that is, the connection is initialized HI when the connection has the label 2 and initialized LO when the connection has the label 4.

Figure 10A:
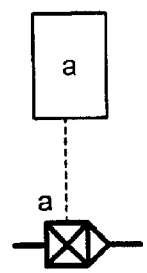
FIG. 10A illustrates symbols representing an event as a data move in accordance with an embodiment of the present invention.

Events often represent data movements in the data path. FIGS. 10A and 19B illustrate symbols we use in a data path and how data moves can be implemented. Suppose that event a represents a data move. FIG. 10A illustrates the GasP module for event a, where the input and output connections for the GasP module are not shown. The data path, which may be multiple bits wide, appears below the GasP module in bold. The five-corner polygon with the cross represents a normally-opaque latch.

Although there are many implementations for a normally-opaque data latch, they are all based on the same principle: a brief pulse at the control input of the latch realizes a data move from the storage location at the left of the latch to the storage location at the right of the latch. For our implementation we assume that the latch consists of a series of keepers, normally-opaque pass gates, and drivers, one for each bit in the data path. The drivers drive the wires at the right of the five-corner polygon, and the keepers are at the input of the latch to avoid any fighting outputs when data paths merge.

Figure 10B:
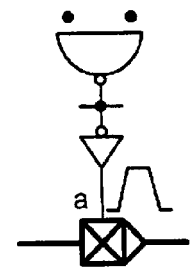
FIG. 10B illustrates an implementation of an event as a data move in accordance with an embodiment of the present invention.

The latch has a label a to indicate that event a represents a data move across this latch. The dashed line between the GasP module and the latch symbolizes that each firing of GasP module a must implement a data move across latch a. We often show the control and data path of a circuit separately, where the labels at the latches in the data path indicate which GasP modules control the latches. FIG. 10B illustrates how a GasP module realizes the data move. When GasP module a fires, a falling pulse starts at the output of the NAND gate with a width of about three gate delays. As a result, the output of the inverter in FIG. 10B creates a rising pulse of about the same width at the control input of the latch. This pulse makes the latch briefly transparent, thereby passing a new data value to the next storage location.

If events with different names must implement the same data move, the inverter in FIG. 10B can be replaced by a NAND gate with multiple inputs, one for each GasP module that must implement that data move. For each latch, at any time at most one GasP module may cause a pulse at the latch. Thus, the NAND gate performs an OR function for falling pulses.

There is a straightforward translation from a specification of a finite state machine into a network of GasP modules, provided the specification is in normal form. A specification is in normal form if and only if for each state transition in the specification there is just a single event leading one state to the next state and every event in the specification has a unique name. The translation of a normal-form specification into a network of GasP modules maps every event to a GasP module and maps every state to a wire connection among GasP modules. Each wire connection among GasP modules representing a state is an input to every GasP module whose event leads the finite state machine out of that state, and the wire connection is an output of every GasP module whose event leads the finite state machine into that state.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus that performs modular division, comprising:
    a register A that is initialized with a value X;
    a register U that is initialized with a value Y;
    a register B that is initialized with a value M;
    a register V that is initialized with a value 0;
    a temporary register H;
    a temporary register L; and
    an updating mechanism that is configured to iteratively reduce the contents of registers A and B to a value of one by applying a plurality of invariant operations to registers A, B, U and V;
    wherein updating mechanism is configured to temporarily store A+B in the temporary register H;
    wherein updating mechanism is configured to temporarily store U+V in the temporary register L.

2. The apparatus of claim 1, wherein the initial values in the registers A, B, U and V satisfy invariant relationships.

3. The apparatus of claim 2, wherein the invariant relationships include:
    $A*Y=U*X \bmod M$; and
    $B*Y=V*X \bmod M$.

4. The apparatus of claim 3, wherein the updating mechanism is configured to maintain the invariant relationships between the values of registers A, B, U and V after application of the plurality of invariant operations.

5. The apparatus of claim 4, wherein the plurality of invariant operations comprise:
    if A is even and U is even, then A:=SHIFT(A), U:=SHIFT(U);
    if A is even and U is odd, then A:=SHIFT(A), U:=SHIFT(U+M);
    if B is even and V is even, then B:=SHIFT(B), V:=SHIFT(V);
    if B is even and V is odd, then B:=SHIFT(B), V:=SHIFT(V+M);

if A>B, then A:=A+B and U:=U+V; and if A<B, then B:=A+B and V:=U+V;

wherein the SHIFT operation denotes a right shift by one bit of the register contents.

6. The apparatus of claim 5, wherein setting A=A+B and U=U+V involves first setting H=A+B and L=U+V, and later setting A=H and U=L if A>B; and wherein setting B=A+B and V=U+V involves first setting H=A+B and L=U+V, and later setting B=H and V=L if A<B.

7. The apparatus of claim 6, wherein the operations of setting H=A+B, setting L=U+V, and determining if A>B or if B>A take place concurrently.

8. The apparatus of claim 1, wherein components of the updating mechanism operate asynchronously, without use of a centralized clock signal.

9. An apparatus that performs modular division, comprising:

a register A that is initialized with a value X;

a register U that is initialized with a value Y;

a register B that is initialized with a value M;

a register V that is initialized with a value 0;

wherein the initial values in the registers A, B, U and V satisfy invariant relationships, including, $A*Y=U*X \mod M$, and $B*Y=V*X \mod M$;

a temporary register H;

a temporary register L; and an updating mechanism that is configured to iteratively reduce the contents of registers A and B to a value of one by applying a plurality of invariant operations to registers A, B, U and V;

wherein updating mechanism is configured to temporarily store A+B in the temporary register H;

wherein updating mechanism is configured to temporarily store U+V in the temporary register L;

wherein the updating mechanism is configured to maintain the invariant relationships between the registers A, B, U and V after application of the plurality of invariant operations.

10. The apparatus of claim 9, wherein the plurality of invariant operations comprise:

if A is even and U is even, then A:=SHIFT(A), U:=SHIFT(U);

if A is even and U is odd, then A:=SHIFT(A), U:=SHIFT(U+M);

if B is even and V is even, then B:=SHIFT(B), V:=SHIFT(V);

if B is even and V is odd, then B:=SHIFT(B), V:=SHIFT(V+M);

if A>B, then A:=A+B and U:=U+V; and if A<B, then B:=A+B and V:=U+V;

wherein the SHIFT operation denotes a right shift by one bit of the register contents.

11. The apparatus of claim 10, wherein setting A=A+B and U=U+V involves first setting H=A+B and L=U+V, and later setting A=H and U=L if A>B; and wherein setting B=A+B and V=U+V involves first setting H=A+B and L=U+V, and later setting B=H and V=L if A<B.

12. The apparatus of claim 11, wherein the operations of setting H=A+B, setting L=U+V, and determining if A>B or if B>A take place concurrently.

13. The apparatus of claim 9, wherein components of the updating mechanism operate asynchronously, without use of a centralized clock signal.

14. A method for performing a modular division, comprising:

initializing a register A with a value X;

initializing a register U with a value Y;

initializing a register B with a value M;

initializing a register V with a value 0; and iteratively reducing the contents of registers A and B to a value of one by applying a plurality of invariant operations to registers A, B, U and V;

wherein applying the plurality of invariant operations involves temporarily storing A+B in a temporary register H;

wherein applying the plurality of invariant operations involves temporarily storing U+V in a temporary register L.

15. The method of claim 14, wherein the initial values in the registers A, B, U and V satisfy invariant relationships.

16. The method of claim 15, wherein the invariant relationships include:

$A*Y=U*X \mod M$; and $B*Y=V*X \mod M$.

17. The method of claim 16, wherein the plurality of invariant operations maintain the invariant relationships between the registers A, B, U and V.

18. The method of claim 17, wherein the plurality of invariant operations comprise:

if A is even and U is even, then A:=SHIFT(A), U:=SHIFT(U);

if A is even and U is odd, then A:=SHIFT(A), U:=SHIFT(U+M);

if B is even and V is even, then B:=SHIFT(B), V:=SHIFT(V);

if B is even and V is odd, then B:=SHIFT(B), V:=SHIFT(V+M);

if A>B, then A:=A+B and U:=U+V; and if A<B, then B:=A+B and V:=U+V;

wherein the SHIFT operation denotes a right shift by one bit of the register contents.

19. The method of claim 18, wherein setting A=A+B and U=U+V involves first setting H=A+B and L=U+V, and later setting A=H and U=L if A>B; and wherein setting B=A+B and V=U+V involves first setting H=A+B and L=U+V, and later setting B=H and V=L if A<B.

20. The method of claim 19, wherein the operations of setting H=A+B, setting L=U+V, and determining if A>B or if B>A take place concurrently.

21. The method of claim 14, wherein operations involved in performing the method take place asynchronously, without use of a centralized clock signal.

* * * * *